Sept. 29, 1936.  J. F. WAIT  2,055,808
PROCESS AND APPARATUS FOR TREATING LIQUID
Original Filed Feb. 20, 1930   4 Sheets—Sheet 2
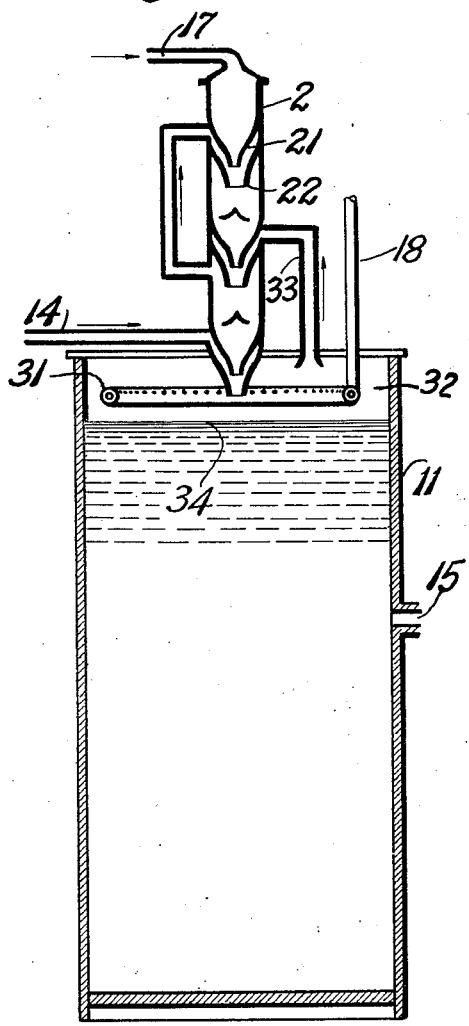
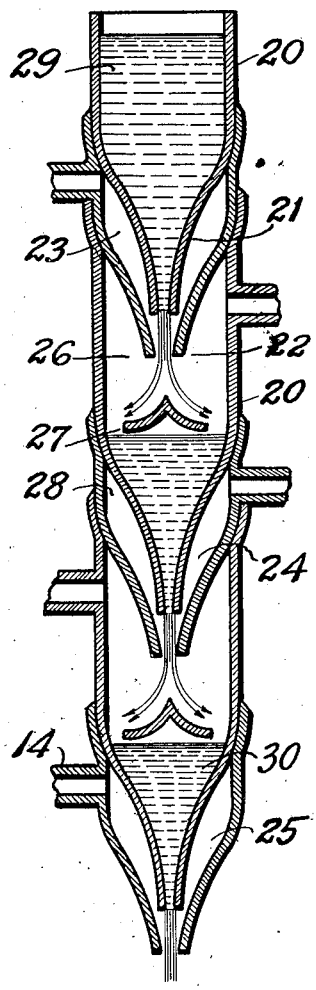
INVENTOR
Justin F. Wait Sept. 29, 1936.   J. F. WAIT   2,055,808
PROCESS AND APPARATUS FOR TREATING LIQUID
Original Filed Feb. 20, 1930   4 Sheets-Sheet 3
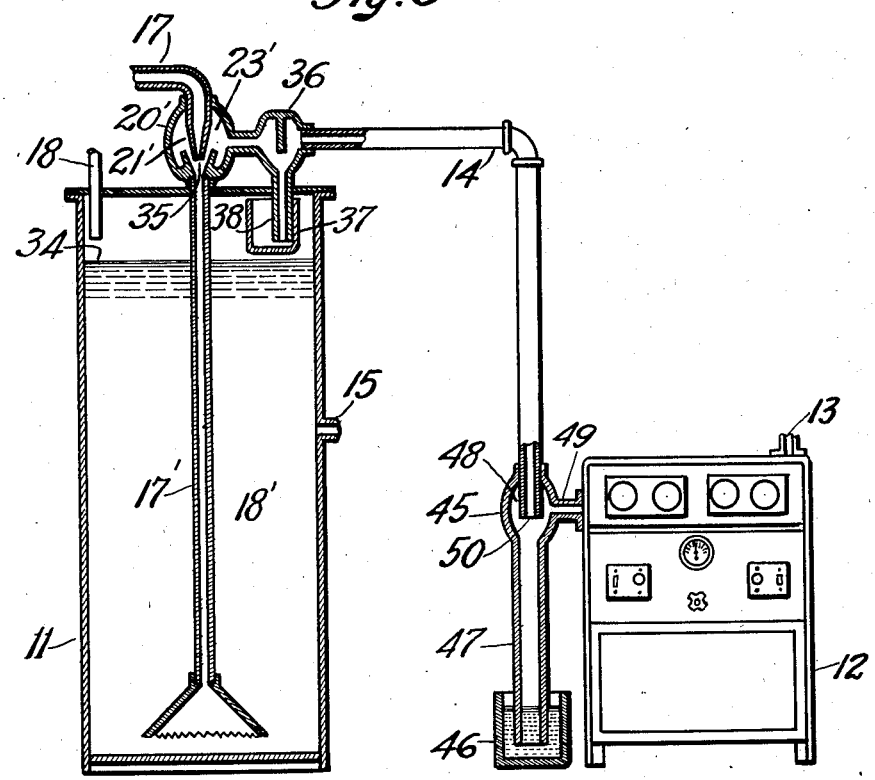
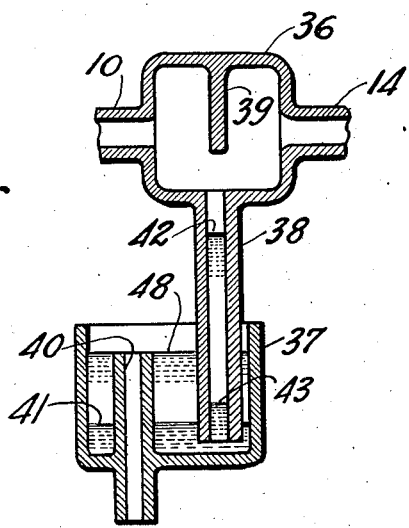
INVENTOR
Justin F. Wait Sept. 29, 1936. J. F. WAIT 2,055,808
PROCESS AND APPARATUS FOR TREATING LIQUID
Original Filed Feb. 20, 1930 4 Sheets—Sheet 4
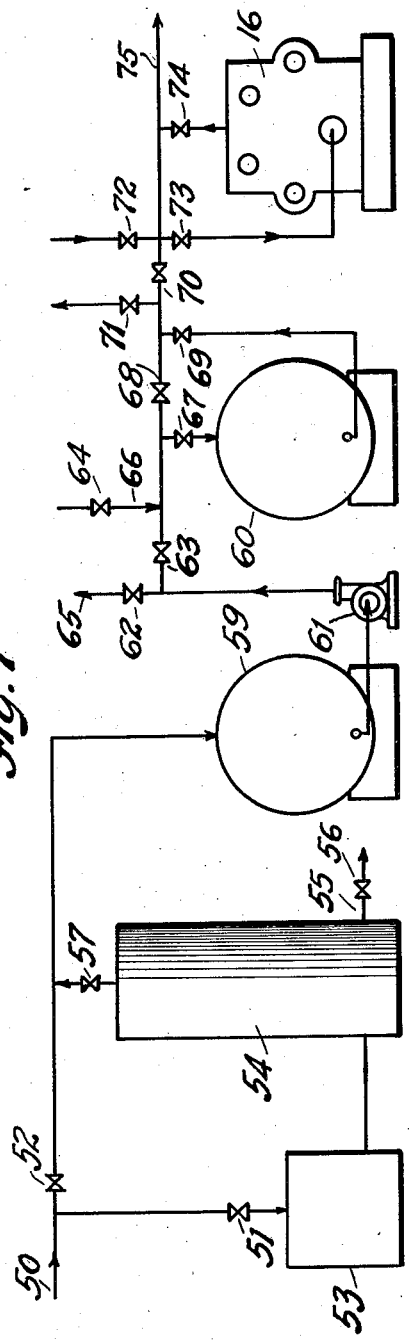
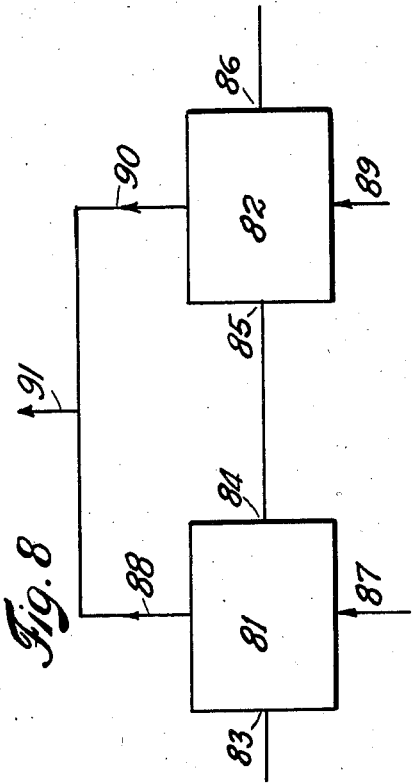
INVENTOR
Justin F. Wait Patented Sept. 29, 1936

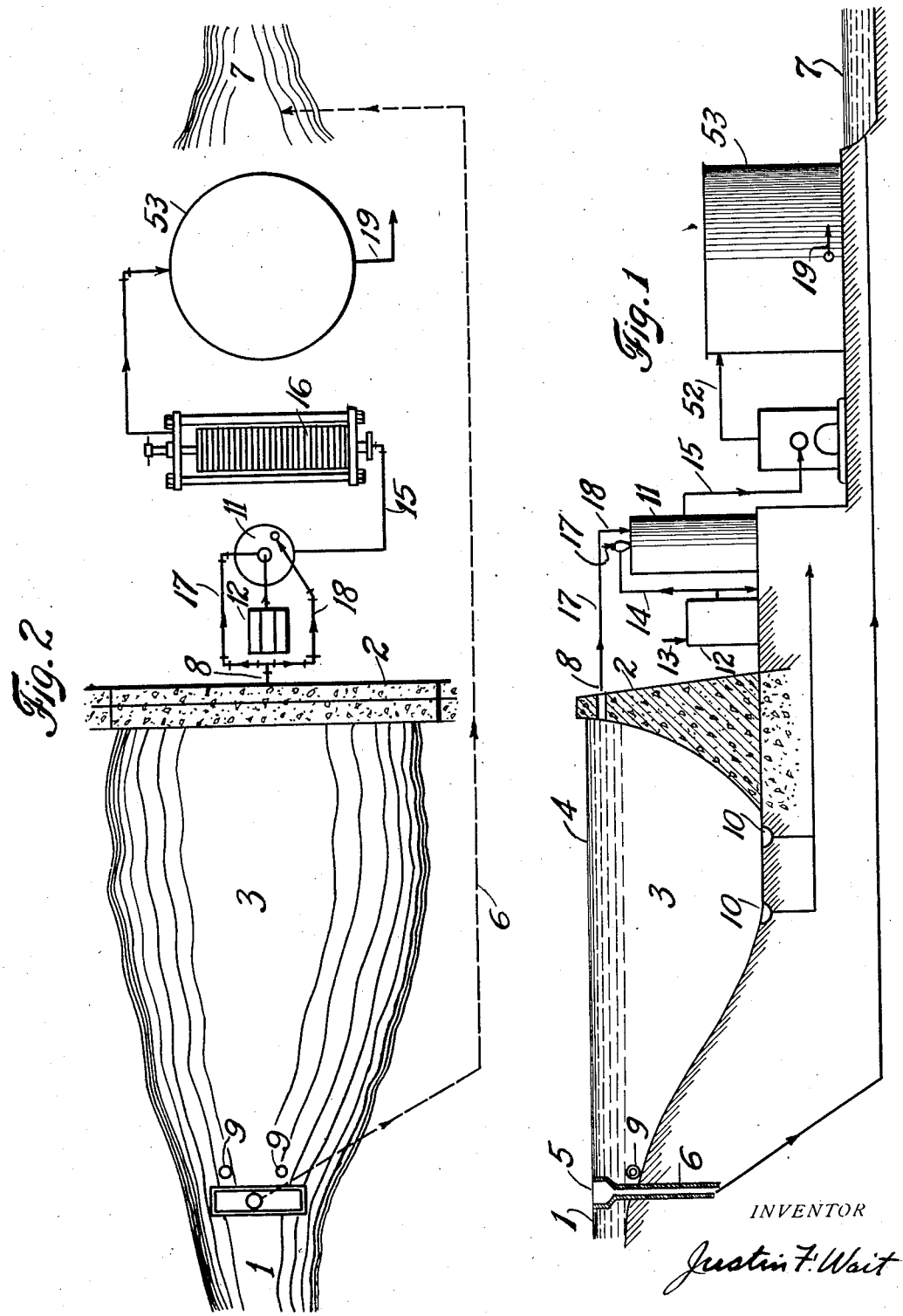

2,055,808

UNITED STATES PATENT OFFICE 2,055,808

PROCESS AND APPARATUS FOR TREATING LIQUID

Justin F. Wait, New York, N. Y.

Original application February 20, 1930, Serial No. 429,905. Divided and this application November 12, 1932, Serial No. 642,380

4 Claims. (Cl. 210—27)

This process relates to improvements in methods of purifying water or other liquid and means therefor. This application contains divisional matter of my application Ser. No. 429,905, filed Feb. 20, 1930, which issued as Patent Number 1,907,691 and embodies features thereof with associated or similar features workable therewith. By its use higher capacities are obtainable from treating equipment and the quality of water or other liquid may be improved to a marked degree. The invention will be particularly described in connection with the purification of water, but it is not restricted to this use.

One of the objectionable features, quite pronounced with commercial units in this art is the diminution of rate of filtration by the gradual reduction of size of the pores of the membrane or other filtering medium and/or increase in thickness of the effective membrane or filtering medium. While a reasonable initial rate of filtration is easily attainable, the amount of deposition from turbid water is of sufficient quantity and of such quality as to form an almost impermeable secondary membrane or filtering medium. By preventing or decreasing such deposition better operation would therefore be obtained. To this end, I have found it desirable to first remove an appreciable part of the colloidal and other suspensions occurring in the water to be treated and/or then to take special precaution to prevent the entrance of undue amounts of pollution into the water to be treated during times of flood. I have further found that by removing most of the organic matter and destroying or rendering inert most of the bacteria before ultrafiltration, high capacities of the ultra-filter are maintained as the amount of the secondary colloidal film is greatly reduced and a colloidal membrane with larger pores may be used. The life of the film or membrane is then also extended considerable.

By treating the impure water with ozone I have been able to reduce the colloidal matter to a satisfactory condition to promote rapid filtration. The amounts of ozone which I have used destroy most varieties of bacteria, particularly those of smaller dimensions. The spore forming type such as are not quickly destroyed by the ozone that is used may then be retained and held inactive by the ultrafilter.

I wish to distinguish between ordinary filtration and ultrafiltration. Ordinary filtration has been used as for water purification and with the production of usable treated product. The ultrafilter removes particles of much smaller dimension as in the range of the smaller colloidal substance as in general from about $10^{-4}$ to $10^{-7}$ cm. in size. It involves the use of thin membranes such as collodion, gelatin or parchment or the equivalent which filter at a rate of less than about 50 cc. per sq. ft. per minute with about 50 lbs. pressure.

I select a membrane with a size of pore that will yield a water which will be sterile for all practical purposes and which will remain free from bacterial growths while out of contact with a contaminating source and when handling water that has been ozone treated. I have found that particles causing turbidity are composed in part of bacteria. These are generally held in suspension with the solid matter.

The physical and electrophysical condition of these complex particles are such that they normally tend to plug the pores of membranes and form a slimy, almost impermeable secondary membrane which acts in series with the original membrane and ultimately prevents passage of appreciable quantities of water. By my invention the properties of these particles are changed and a marked improvement is obtained. Bacterial bodies are either destroyed or so altered that ultrafiltration with large film pores may be depended upon to give uniform results and with but slight diminution in the delivery or capacity factor.

The invention is especially applicable to a process using ultrafiltration or for the production of a brilliant or "polished" water. It may however be modified or used in part for the production of a commercial water of a quality satisfactory for many purposes, as for example by elimination of the ultrafiltration step. Such a modification makes it possible to produce a water of excellent quality while employing ordinary filtration and allowing quite small quantities of colloidal matter to exist in the final product. In some instances ordinary filtration may be omitted.

The invention makes it possible to remove impurities in a preliminary step by a relatively cheap and, in a sense, far better method, thus decreasing the required amount of ultrafiltration so that the life of the filtering medium of an ultrafilter is greatly extended and costs are otherwise reduced. By using a combination of settling and ozonation steps to decrease or remove turbidity my process actually destroys a large portion of the organic matter and bacteria in a very convenient manner and alters remaining portions so as to facilitate filtration or produce an acceptable quality. Impurities such as iron and hydrogen sulphide may be likewise precipitated and the particles agglomerated so that they may be more easily removed. Gaseous impurities, such as carbon dioxide are removed during the course of the process and the removal thereof is frequently of assistance in reducing the content of other impurities, particularly when it influences the hydrogen ion value which in turn influences the degree of dispersion of colloidal matter and the fitness of some waters for human consumption.

Sterilization in the manner indicated herein is generally an aid to ultrafiltration. By the expression sterilization as used herein I mean, the treatment of water to cause a material reduction in its bacterial content to such an extent that on analysis the water would be pronounced potable.

The common way of sterilization heretofore used has been by chlorination. The use of the chemical chlorine in any of its forms is undesirable. In amounts sufficient to properly sterilize the water, it usually imparts an odor and a taste to the water and in many instances increases its color. While ozone has been used in many instances for purifying water, its cost has prevented its common use and the water treated therewith has not usually been sufficiently brilliant or "polished", the ozone itself frequently producing suspensions, colloidal and otherwise, which even cause turbidity or increase the normal amount thereof.

The amount of impurities contained in the water to be treated generally determines the amount of ozone required for its treatment and hence influences the cost of purification. Filtration, especially if augmented by coagulation, will greatly reduce impurities and hence the amount of ozone required. Apparatus required to give good filtration is expensive and involves investment and operating costs, as well as care in operation. My invention enables me to reduce these costs and provide an economic unit for purifying water to an acceptable degree. It is particularly applicable to the usual conditions found when a small stream supplies water for municipal or other use.

For such application the invention involves the use of ultrafiltration in combination with the well-known storage reservoir for settling and storage purposes with an unusual provision which allows the reservoir to operate uniformly and which prevents the pollution and erratical operation usually experienced. I have found that with a settling period in excess of 60 hours water sufficiently low in these impurities can be obtained so as to permit the economic use of ozone for pretreatment before ultrafiltration. By adding ozone in admixture with air in an amount sufficient to reduce the color to below about sixty percent of the untreated water, the qualities of the partially purified water are very suitable for ultrafiltration. This appears to be generally true of water whether it is derived from a swamp or from a rapidly moving stream. Such treatment gives water of satisfactory color, turbidity and odor, and water which is also of a satisfactorily low bacteria content and practically free from undesirable taste.

In carrying out the preliminary treatment by sedimentation and sterilization by ozone it is desirable to protect against undue pollution of a treated water supply by impure water obtained as in flood time. The invention includes special means whereby it is then possible to economically apply ozone to water purification and without the expense of preliminary filtration.

The process commonly used for the collection and purification of water usually requires the erection of a dam across a stream bed to produce a storage space or reservoir. In most instances the quantity in storage is equivalent to a number of days of water consumption. In general, the water supply, usually a river or creek, varies immensely in the quantity of water delivered, so that the ratio of the supply to the storage volume varies greatly. In many instances the supply is less than the consumption during dry seasons and several or even hundreds of times greater than the consumption during a flood period.

As a control means to insure proper preliminary treatment, my invention provides that the velocity of flow be uniformly low and that the time element be made positive for settling and not below about 60 hours. An advantage of the reduction in velocity is that relative increase in the action of gravitation on suspended impurities results. Considerable turbulence of flow accompanies high velocity in such a supply stream. It is almost invariably sufficient to retain, in almost uniform suspension, impurities which could otherwise separate by sedimentation from the upper layers of water if they were still or nearly so. My invention provides means to give at substantially all times approximate uniformity of flow and insures a velocity considerably below the point of turbulence. This is to be contrasted with the ordinary collection and settling reservoir where in flood water is allowed to flow through the reservoir displacing and wasting clear settled water. In many instances the velocity of flow is sufficient to cause some turbulence not only preventing purification by settling, but actually stirring up previously settled impurities which then further contaminate the supply.

My improved method involves a control to keep the water at a normal level. By normal level of a reservoir or equivalent water storage is meant a level between the normal limits of the reservoir when operating at near its rated capacity. It is obvious that this level will vary, becoming depressed during periods of heavy demand, and low supply and being elevated during periods of low consumption and high rate of flow of the water supply.

Ordinarily a water supply, upon being increased in quantity as in flood period is allowed to run through the storage reservoir, the spillway thereof then carrying away large amounts of excess water. By my invention I allow only a portion of the flood water to pass into the storage or collecting reservoir. This portion is preferably sufficient to keep the reservoir or basin at its normal level, regardless of the size of the supply stream, and makes it necessary for the remaining portions of the flood flow to be diverted and disposed of as by discharging it into the stream bed below the dam or walls which form the reservoir or basin. The water so diverted may be wasted or it may be utilized as for irrigation or power development.

The ultrafilter has many advantages over the ordinary filter of siliceous composition such as fine sand or other silicate or even the usual artificial or normal stones of "agglomerated" silicate or equivalent particles. The ordinary filters have large sized openings with concave entrances which easily become plugged with colloidal matter to considerable depth. The size and shape of the openings is such as to permit the passage of some bacteria and other impurities. The ultrafilter may be controlled so that it will retain all of the objectionable impurities and prevent the penetration of these impurities to any appreciable depth into the pores.

An ultrafilter involves the use of a membrane or an equivalent means such as a deposit of colloidal matter in a thin film. The film is such that impurities will not penetrate into the system beyond the film thickness. It is further selected or made to withhold substantially all of these impurities even at the initiation of operation as compared with ordinary filters which yield a water of poor quality during the early period of its operation and which actually depend upon "plugging" of the pores to reduce to an acceptable extent the amount of impurities passing therethrough. The common type of "plugged" filter invariably allows bacteria and color forming colloidal matter to contaminate the final product. The excessive quantities passing through during the early operating period collects and may even grow bacteria during its existence in the filter pipes and other passages or in the storage system.

A properly functioning ultrafilter will retain substantially all of the particles below one one-thousandth of a centimeter in size, such particles being visible to the eye. The ultrafilter withholds particles which cannot be seen even under the microscope, but which may, however, in some instances be recognized by assistance of the ultra-microscope with its "indirect" vision. This should be compared with the ordinary filter which frequently allows particles as large as about one tenth of a centimeter to pass.

Ozone functions in a complex manner. Without committing myself to the exact method by which it operates I would express the equivalent "mechanics of its operation" an oxidation of organic matter, and alteration of molecular formation, yielding color and/or odor and/or taste. It actually destroys some organic products, probably by actual "burning" some of the carbon atoms to carbon dioxide and hydrogen atoms to water. In acting on bacteria, ozone kills and retards growth and permits agglomeration of the bodies and in so functioning it doubtless oxidizes to partial or total destruction some of the bodies of the organisms which I would class as bacteria. Ozone thus prevents possible accumulation of organic life at the filtering medium where byproducts of such life would enter the pores and cause plugging. Maintenance of slight excess of ozone within the ultrafilter will prevent growth or at least reduce it to a negligible value as well as byproduct formation which is detrimental to ultrafiltration.

The method of applying ozone is an important factor as it must be intimately contacted with the water to be treated. Methods involving high pressures may be used with reasonable success, but they involve unnecessary inconvenience and high costs. I have developed a method of mixing which is suitable for receiving an ozone-air mixture and mixing it with water to be treated and which can be operated with but little pressure loss. I have found it advantageous to form a thoroughly mixed mass and to keep such a mixture under appreciable pressure and to break successively the air masses containing the ozone into small portions, agglomerating the same and again breaking the same into small portions while contacting the small portions of air with water.

The strength of the ozone and the time of contact influence the physical properties of the impurities remaining after ozonation. I have found it desirable to first treat the water with air containing ozone of low concentration and to subsequently treat the then partially purified water with air containing ozone of higher concentration. This gives residual suspended portions which are more easily filtered. To accomplish this I have devised a system of countercurrent flow which brings the air of low ozone concentration into contact with water at greater pressure than that at which the high ozone concentration is applied.

This control of concentration and pressure has enabled me to accomplish the desired pretreatment with very low ozone consumption and with a very low time factor. In former tests from about three to ten minutes have usually been needed for the contact, but I have been able to accomplish very satisfactory results with my invention within about one minute and fair results within one-tenth of a minute.

Ozone is an unstable form of oxygen and under the conditions described is almost completely decomposed within about one hour. Within two minutes a large amount of the ozone has been dissipated or reverted back to oxygen, a stable substance. By quickly treating the water as above described, the desired reactions are brought about with less consumption of ozone. This is due in part to the short time element and hence less decomposition of ozone during the treating stage.

I have further found that it is possible to treat water with an excess of ozone and, by controlling the time element I can use the excess ozone to treat other water by mixing water containing excess ozone with the other water to be treated. To accomplish economical operation, such mixing is preferably carried out within about one minute of the addition of the last portion of ozone to the first portion of the water. To simplify operation, it is desirable to release portions of the air or other gas associated with the ozone in treating the first portion and to do so preferably before mixing with the second portion.

My invention will be understood from the description in connection with the accompanying drawings in which Fig. 1 is a vertical section showing the invention; Fig. 2 is a plan view of the same; Fig. 3 is a vertical section on an enlarged scale showing some of the details; Fig. 4 is a vertical section on an enlarged scale showing details of a modification; Fig. 5 is a vertical section showing another modification; Fig. 6 is a vertical section on an enlarged scale showing some of the details of Fig. 5; Fig. 7 is a schematic illustration of treating apparatus while Fig. 8 is illustrative of preferred hook-up of series connected ozone generators.

In the drawings reference character 1 indicates a stream that is held by means of a dam 2 to form a reservoir or storage space 3 with a normal water level 4. A widened outlet or weir 5 with a discharge pipe 6 is used to carry away water in substantial excess of the consumption. This excess may be discharged as in the stream bed at 7.

The water in the reservoir 3 has but little movement so that within about sixty hours the upper layers will be of very low turbidity. An outlet at 8 may be used to withdraw the partially purified water. In extreme instances where the foreign matter is very colloidal or where there is a demand for unusually large quantities a coagulating agent such as alum may be added as at 9. A baffling device, not shown, may be used if desired to facilitate mixing the alum with the water. Settled matter may be withdrawn from lower layers through outlets 10.

The partially clarified water is passed through a contacting unit or tank 11 preferably of the type shown in Figs. 3 and 4, but which may be as illustrated in Figs. 5 and 6. Ozone is produced by means of an ozone generator indicated at 12 with an air inlet 13 and an ozone air mixture line 14 leading to tank 11. After contacting with ozone in the tank 11 the water passes through the line 15 into the ultrafilter 16. I have found that if a portion of the water discharging through the outlet 8 is bypassed and carried to the mixer 11 by a separate line 18 there is a considerable saving in cost of operation. Ozone in excess of that required to treat the water passing through the branch 17 of outlet 8 into the tank 11 is generated in the ozone generator 12 so that the water that passes through line 18 is thus indirectly contacted with ozone. Filters, with pumps if required, may be placed in the flow between outlet 8 and ozonating zone 11 and control means may be applied to describe appropriate flow of the water as between ozonating zones and coarse and fine filtering units and storage and waste. This flow may be directed by an analyzer or like unit operating on effluents from the parts indicated which may be used in multiple.

Water which has been ultrafiltered is pure and sparkling and is ready for delivery to the consumer. This water will be of zero color and zero turbidity or practically so and is to be distinguished from ordinary water with appreciable color and a turbidity appreciably in excess of about one part per million. The treated water obtained by operating the elements of my invention will be practically sterile. The bacteria per cubic centimeter will be below about five or ten whereas ordinary water is about 100 to 500. It is thus clear that the treated water is vastly improved over that which has heretofore been obtainable from surface water. A distinguishing feature is that the water may be thus produced without the result of permanently existing added substance such as chlorine or alum or alkaline compounds. The water is thus superior and of greater value. It may flow through the line 52 from the ultrafilter 16 to a storage tank 53 and thence through the outlet 19 to a supply main.

The mixer 20 shown in Figs. 3 and 4 contains a nozzle 21 which may be of circular or elongated cross section which discharges through a second nozzle 22. A reduced pressure is caused in the chamber 23 or space between nozzles 21 and 22 and likewise in the chambers 24 and 25 which operate similarly. Gas contained in the chamber 23 is mixed with water and portions which are not dissolved or reacted are released in the chamber 26 between the chambers 23 and 24. The water is preferably diverted by means of the baffle 27 and passes from this baffle into the chamber 28 above the nozzle, which is similar to the chambers 29 and 30 above the other nozzles.

The mixer can thereby be controlled to give countercurrent flow of water and ozone-air mixture entering through the pipe 10. Water which might be by-passed through the line 18 could be distributed by means of a perforated pipe 31 where it contacts with gases contained in the chamber 32 located below the mixer 20. These gases are then passed upward through the line 33 and into chamber 25. Air released below the surface 34 in bubble form assists in mixing the contents of the tank 11.

In the mixer shown in Fig. 5 ozone may be introduced into liquids such as water by means of the water jet injector 20'. The hydrostatic head of the water entering through the branch pipe 17 passing through the nozzle 21' causes suction in the chamber 23' around the nozzle which in turn causes the air-ozone mixture from the ozone generator 12 entering through pipe 14 to be injected into the water at the region 35. The direction and turbulence of flow causes thorough mixing of the air and water. Such applications generally involved discharge of the mixture of air and water through a vertical pipe 17' leading to the bottom of a mass of water 18' contained in vessel 11. Bubbles of released air rise to the surface and are released. When the water pressure is materially reduced, an air lift effect is produced and air rushes upwardly carrying water which is splashed upwardly in pipe 17' and outwardly through the air inlet pipe 10.

The application may include a safety device to prevent water from entering the ozone generator. As an example, such device comprises chambers 36 and 37 which may be combined. These chambers are shown on an enlarged scale in Fig. 6 and operate as described below to separate water and air and to prevent water from entering the piping 14 connecting with the ozone generator 12.

The pipes 14 and 10 are connected to opposite sides of the chamber 36. An outlet 38 leads from the bottom of the chamber 36 to the chamber 37. A baffle 39 in chamber 36 is of advantage to prevent the mixture of liquid and gaseous matter delivered by the pipe 10 from passing directly to the line 14. The chamber 36 thus acts as a separator, the liquid collecting in the bottom and passing downward by gravity through the outlet 38 and eventually escaping by flowing out through the outlet 40 in chamber 37 into the tank 11, thus maintaining a constant level in the chamber 37 above the lower end of outlet pipe 38.

During normal operation the region at the upper end of outlet 38 is under sub-atmospheric pressure of say about four pounds. This would tend to suck the water from the chamber 37 and if the length of pipe 38 is less than about nine feet air would be drawn into the chamber 36 from the chamber 37 and perhaps to the exclusion of gaseous fluid from line 14, thus shutting off the supply of ozone from the generator 12.

By keeping a dense immiscible layer in the bottom of the chamber 37 at a level 41 above the lower end of the pipe 38 and giving a large area to the chamber 37 as compared with pipe 38 it is possible to withstand a fairly high vacuum at the upper end of this pipe 38 while allowing the liquid level in the pipe 38 to rise only to some level as indicated at 42. If mercury is used for the dense liquid it will rise to some such height as 43 so that the difference of the weight of the columns from level 41 to 42 and from level 41 to 43 is equal to the difference of the pressures at region at the upper end of the pipe 38 and that above the upper end of the pipe 40. When the injector is shut off and water and gaseous fluid splash into the chamber 36, the water flows downwards and out through the outlet 40.

Another device to prevent water from entering the ozone generator 12 is shown near the generator 12. This separator may be two separate chambers 45 and 46 illustrated connected by a pipe 47 or the corresponding parts may be within a single casing. The essential elements are a separating region 48, a gas inlet 49, a gas outlet 50 adapted to cause a change in direction of flow and a water outlet 47 with water seal 46 which permits water to escape and prevents air from entering chamber 45 except through the inlet 49. Air to be treated by the ozone generator 12 would enter the same way at 13 and would thence pass through pipe 14 to the mixing point 35.

In clarifying water or other liquid for use or for subsequent treatment it is frequently of considerable utility to control the flow, the treatment or the performance of means for treatment by determination of the color effect of one or more components of the liquid. For such purpose a splitting means may be used to disperse electromagnetic waves such as light or waves of greater or shorter range. This may be done as in a manner similar to that shown in application Ser. No. 489,701. Thus transmitted or reflected light may be used and if desired with prism or diffraction grating effect. Light used for such operations may be steady or intermittent and even so made invisible such as is described in my previous application.

The degree of treatment may so be controlled and preferably automatically by qualities of the liquid or a component or components thereof, and, depending upon results by treatment, subsequent mode and extent of treatment may be prescribed and carried out. As an example, water from the storage reservoir may be analyzed by the described or other appropriate means and if impurities are found to the extent of over about one or two hundred parts per million the water may be treated as by automatically charging lime and alum and filtering in relatively coarse sand filters. The effluent from such filters may on analysis be found to contain above about 50 parts per million and the flow then directed through secondary fine sand filters or other form of filter which will reduce the impurities to below about 10 and preferably to less than about 5 parts per million.

At times the settled water will be found to be below about 50 whereupon the analyzing means will be caused to actuate control means which will flow the water direct to consumption or to the secondary filters depending upon requirements and prescribed procedure. When the effluent from the coarse filter is below about 10 it may also be diverted as to consumption. The water of low impurity content may be treated as by ozone addition, the method thus insuring a minimum content of impurities before such treatment. Where units such as sand filters of like or similar construction are used the newly washed filter may be used for the coarse filter and the filter which has been in use for some time and therefore less pervious may be used as the fine filter. The flow may so be altered in sequence of treatment. It is often preferable to have greater filtering surface in the class of less pervious filter.

The filters may be preceded by an electrical coagulator which may serve to coagulate and/or electrolyze the water and comprised of parallel plates of metal such as aluminum and iron spaced about a quarter of an inch apart. With direct current and a potential of from about 5 to 20 volts the current flow will be about five amperes per square foot and more or less depending on the water and the desired degree of treatment. It is desirable that water so treated be held for from about two to about ten minutes before filtration and that it be ozonated after such treatment and before ultrafiltration to the extent of about five grams per thousand gallons.

In treating liquids which show color variation during the treatment such as water or oils wave bands of different lengths may be used for control or the intensity factor may be applied or utilized. As an example ozone may be used for bleaching or for forming tarry substances or resin like bodies as within a mobile liquid or as viscous liquid adhering to some body such as oil cloth. The color change may be noted by differential action as between a standard or untreated liquid and the treated liquid. It is thus possible by using differentials to control factors such as the speed of travel of the liquid or the concentration by reason of the color change. If the color is too dark or such equivalent (as to analyzing) as dryness is insufficient the concentration may be increased and/or the time element lengthened to yield further treatment. In instances the substance may be flowed or conveyed to a second treating zone with different conditions such as concentration or temperature and where the treatment is completed or furthered or whereat other agent or reagent such as ultraviolet light may be utilized. Stubborn products may so be treated and products with variance in successive portions or lots may be treated differently.

In the case of filters such as the continuous type shown in U. S. Patent No. 1,667,465, the effluent from a section or portion of the filtering device may be analyzed and diverted into various channels for use or treatment. Thus a filter or section of a filter or other separating device discharging undesired impurities or amounts may be separately controlled as by analyzing the various lots or flows of discharge. In such manner an unusually high quality may be had in selected lots. Other lots may be diverted for certain use and still other portions may be recycled. A defective performance of a portion of the equipment may be so prevented from disturbing the net operation of others or of the whole. In the described case of water purification for example, portions from the reservoir or the filters may be satisfactory for use and so diverted for use or final post-treatment while other portions will be treated or diverted. As a health or safety provision, pollution preventing means doubtlessly has considerable utility. Similarly in settling systems or their equivalent various degrees of separation are realized at a particular time and drawoffs from sections may be provided with an analyzer in turn directing or prescribing the flow and/or treatment.

The control of the amount of ozone may be as by varying the amount of air passed therethrough. Thus on an ozonator, of the general type described in Ser. No. 294,141, valves controlling the gas flow may be opened, closed or throttled or operated thusly as a pilot or bypass valve in connection with another valve in the main passage. The analyzer may thus be used to vary the amount of ozone produced since this is dependent upon the volume of oxygen-containing gas acted on. In general the amount of ozone should be apportioned as a factor of amount of water and turbidity and/or color of the water. The analyzer may thus facilitate color compensation and be utilized with a compensating means acting on the volume control. Prior systems had indefinitely controlled ozone as regards flow and kept the treatment of a given water per unit of volume supposedly constant. The amount of ozone may be utilized for diverting very small amounts and testing or analyzing them as by color change by starch-iodide means. When color is well reduced a minimum of about 1 to 3 grams per 1000 gallons may be introduced and control affixed on this basis.

In multiplicity operation it is possible to combine the advantages by ozonating at two or more places. Thus ozone may be applied and a short time element of about a few minutes or less allowed before other amounts are added. Thus a treatment with low ozone concentration may be used to start or to facilitate separation of iron oxide, sulphides or other impurities. This application may be made as near the points 9. The entire storage system may thus be used for settling out impurities.

Under unusual conditions alum and an alkaline substance may be desirable. They may be added similarly as at or near 9. In such a manner where a matter of days and weeks is allowed for settling the required amount of chemical is very much smaller than is otherwise the case. Where water has a characteristic acidity or alkolinity as regards the human system carbon dioxide or other acid producing substance may be introduced while with acidic waters an alkaline solution or the equivalent may be added. In special cases well water which is acid may be added to alkaline water from a well or surface source. As a coagulant, clay may be obtained locally and treated with burned sulphur and this in admixture with the water may be rendered alkaline by common means and so used to form a compound which agglomerates impurities.

The ozone contacting elements may be used to mix ozone-containing water with the contents of the reservoir or other large body or mass of liquid. Such water should contain about ten to twenty grams per million gallons. Thus a selected portion is highly treated and at periods so insuring occasional treatment at high potential and thus operating on impurities not otherwise attached. Artificial or natural circulation may be effected as within a restricted zone about the withdrawal line. In this manner ozone may be used to treat water in a large body and hold it at higher quality. Treated water may be flowed into the body and/or in currents within it to yield displacement and/or mixing effect as required. Treated water may be introduced as at points 10 or above these points and the flow would be towards the place of discharge into the treating system. The current or flow of such water may be in excess of the amount of water treated as by the opening system and the movement so facilitated. Such operation has use as in a swimming pool wherein bottom or near-bottom inlets are used and the water passed upwardly overflowing into outlets or gutters and a portion returned therefrom for treatment as with ozone while the main mass is recycled as for displacement and to lift impurities otherwise left in the system. A portion of the non-treated water may be separately settled or filtered for removal of suspended particles. The mass recirculated, or in effect so moved, should be at a rate in excess of about fifty percent an hour. When this flow or portion thereof is filtered it may be at the rate of about ten percent per hour. With coarse filter or screen as for removing floating material the rate of treatment is preferably between about thirty and sixty percent per hour. In such application the ozone at about 10 may be made porous or perforated so as to allow the flow of large amounts of air with ozone that may be added thereat to yield agitation and/or treatment of the water and the air above the water. Such bubbles should be kept to within about 5% of the volume of the water.

Water which is treated by my invention is substantially free from odor, color, turbidity and bacteria whereas water by ordinary treatment is quite high in these properties. It is possible to maintain a large mass of water practically free from odor and color and with a turbidity and bacterial count of less than about ten and generally running about two and five. Such bodies may be maintained at such figures with normal pollution and even after weeks and months of usage. Surface water may be treated so that three or four of the factors turbidity, color, odor and bacteria are zero. Water of a swimming pool after being used for four weeks may be kept when in use at a turbidity below five, a color of zero or practically so and at a bacterial count of less than about ten. Such water is obviously much better than or as good as the best commercial supplies of drinking water derived from surface waters.

The design factors and control conditions established herein and those claimed have been found critical as to that required to yield water of a purity not previously obtainable and without undue operating time or cost. By their use satisfactory capacity may be obtained and water of unusual properties produced. Surface water may thus be altered into a water of highest quality. Water used for bathing may be kept with higher purity than requirements for potable water and body wastes rendered inactive or destroyed.

I do not limit my claims to the exact equipment or means and methods shown but include other approximately equivalent means which may be used to obtain and indicated results.

Another example of the application to treating of liquid such as water in a stream flow is utilization of a selected section for storing treated water. This section may be part of the main settling or storage space or it may be a separate space in the stream flow preferably close to the first space. The feature of storing liquid for a long period after ozone treatment is unique to my process. Impurities may thus be acted on by ozone and allowed to agglomerate which is not the case in prior applications. Recirculation of water or other liquid through a treating zone and back into and through a portion of storage space insures successive treatments and continued treatment within the space. Portions of the impurities are thus removed by settling while other portions are more readily removed by filtration. In this manner, reaction of some of the portions may be continued over a period of a great many hours or days during which time equilibrium is closely approached. It is to be noted that the quiescence of the reservoir is utilized both with treated and untreated liquid. The treatment may involve filtration as a second separating step and thus treated, the liquid readily responds to ozone treatment.

The method permits material equilibrium to be reached especially as regards one or other gas which may be imposed as the storage system. Where air for example contacts the liquid it may extract gaseous sulphur or organic compounds and carbon dioxide. The operating method of storing treated water within contact of treated water facilitates construction economy and power at off-load hours may be utilized with a corresponding reduction in operating costs. In case of an emergency such as a fire or broken lines a large amount of fairly well treated water is available. The greatest load of a water system is generally from about 7 a. m. until 10 p. m. The procedure preferably involves passage of greater amounts of treated water into the storage reservoir at such times and at valleys of the load. Means are provided so that the flow into storage may thus be controlled as a function of the load. At times of low load, substantial portions of the water may thus be raised up to relatively high ozone content of between about 10 and 30 parts per million at the treating zone while substantial portions within the storage system may be held at about one part per million.

Water in a reservoir may be treated-water confined to a selected portion of the stream flow. Thus outlet 8 of Fig. 1 may be at or near a side of the storage space and a water inlet may be provided at a point a distance away therefrom. Treated water may thus be flowed into the storage space and the space between such point and the outlet will gradually be filled with water of increased purity. This inlet may likewise be placed at a point somewhat above the points 10 thus increasing the amount of treated liquid in storage and in which water action continues and/or components thereof act on contacting water not treated in the regular manner. The reservoir is thus usable for the additional treatment as with ozone.

Fig. 7 further illustrates how the process or means may be operated or arranged. Line 50 may be connected with the outlet 8 of Fig. 1. Valves 51 and 52 control the flow so that the coagulator 53 may be instead an electrolytic unit as disclosed in Ser. No. 616,071 may be used with time-giving unit 54. The outlet 55 may be connected with storage space as above indicated through valve 56. As an alternate method valve 57 may be opened allowing flow to line 50. This treating unit may be by-passed as by closing valves 51 and 57 and opening valve 52 or if its operation is desired in flowing liquid to storage a separate inlet not shown may be attached to line 58. Filters 59 and 60 may be of the sand type and in multiple. They may be interchangeable as to operation by use of piping not shown. Thus one such unit may operate as 59 while two or three such units may operate as 60. A pump 61 may be provided in the system as illustrated or at other convenient place in the system. Valves 62, 63, and 64 may be used to direct the flow. For example line 65 may pass to such point as the ozone mixer and/or to storage while line 66 may be a return from the ozone mixer. Valves 67 and 68 and 69 may be used to direct flow through filters 60 if and as desired. Valves 70, 71, and 72 may be used to direct the flow as to and from the ozone mixer or other part. Valves 73 and 74 may be used to control water to be treated by ultrafilter 16. Line 75 may be connected with the supply main or other point as indicated.

The process may be provided with preferred protective means such as is illustrated in Fig. 8. In principle it involves operation of two groups of dielectrics in series connection electrically so that if one element of one group becomes shorted or if it permits unusual leakage, the total flow will not be shorted because the elements of the second group are still of sufficient "resistance" to retard excessive flow. Thus two discharge systems are represented as 81 and 82 with electrical connections 83, 84, 85, and 86 arranged for series connection as shown. The arrangement may be similar to one of those shown in my application Ser. No. 616,071.

Under some conditions the treatment within the failed unit, say, 81 will be insufficient as to electrolytic, ray discharge or ozone generation and water passing therethrough as represented schematically by lines 87 and 88 may be insufficiently treated. The water being treated by oscillating unit 82 and passing through lines 89 and 90, however, will generally be treated the same or more extensively and it may then be mixed with water or other liquid which has been treated insufficiently or not at all. Schematically, this is represented in the flow chart by the union of lines 88 and 90 to form the single line 91. As an equivalent lines 88 and 90 may be passed into and mixed with any other mass of liquid to be treated.

Such process insures continuity of operation and yields a desirable form of assurance. Valved controls may be provided to decrease or to stop the flow through a circuit when a rupture has thus occurred or when the treatment is inadequate for other reason. Conductivity cells may act as legs of a Wheatstone bridge, or the like, and the differential of conductivity as between liquid in lines 67 and 88 used to control flow. Such or similar control may also be utilized to control the ratio of the treating effort to the amount of liquid being treated. Color effects may be used so as to increase the degree of treatment when turbidity increases.

I claim:

1. In apparatus for the production of water substantially free from color, odor, turbidity and bacteria the combination of pressure supply means, an inlet adapted to pressure, an ozone mixer, with suction means, an ozone generator, a sealed separator adapted to prevent water from entering the ozonator and to discharge separated water and an ultrafilter with filtering means less than about one one-hundredth of an inch in thickness and having a normal filtration capacity of less than about ten cubic centimeters per square foot when under a head of about fifty pounds, and means for passing liquid from the supply and gaseous fluid through the ozone generator and to said mixer and liquid from said mixer through said ultrafilter.

2. In apparatus for the production of water substantially free from color, odor, turbidity and bacteria the combination of pressure supply means, a coarse filter, an inlet adapted to pressure, an ozone mixer with suction means, an ozone generator, a sealed separator adapted to prevent water from entering the ozonator and to discharge separated water and an ultrafilter with filtering means less than about one one-hundredth of an inch in thickness and having a normal filtration capacity of less than about ten cubic centimeters per square foot when under a head of about fifty pounds, and means for passing liquid from the supply and gaseous fluid through the ozone generator and to said mixer and liquid from said mixer through said ultrafilter.

3. In apparatus for the production of water substantially free from color, odor, turbidity and bacteria the combination of pressure supply means, an inlet adapted to pressure, an ozone mixer with suction means, an ozone generator, a sealed separator adapted to prevent water from entering the ozonator and to discharge separated water, said separator being in two parts, one sealed with mercury and the other sealed with water and an ultrafilter with filtering means less than about one one-hundredth of an inch in thickness and having a normal filtration capacity of less than about ten cubic centimeters per square foot when under a head of about fifty pounds, and means for passing liquid fluid from the supply and gaseous fluid through the ozone generator and to said mixer and from said mixer through said ultrafilter.

4. The process of purifying water in a natural stream of turbid and polluted water flow which comprises reducing the velocity of flow of the water at a selected location in the stream flow, settling impurities from the water, diverting unsettled portions of water from a point in the stream flow above the said location to a point below the said location in such quantities that the velocity through said location is substantially unaffected by the rate of flow of the stream while maintaining the amount of water in storage substantially constant and independent of the amount of stream flow, withdrawing water for treatment to render it substantially free from color, bacteria and turbidity and returning it to the zone of settling and so storing treated water in a selected zone within the normal stream flow and adjacent to the place of settling of impurities.

JUSTIN F. WAIT.